United States Patent
Oeltjen et al.

(12) 
(10) Patent No.: US 6,433,069 B1
(45) Date of Patent: *Aug. 13, 2002

(54) HOT MELT PRESSURE SENSITIVE ADHESIVE WHICH EXHIBITS MINIMAL STAINING

(75) Inventors: Susan T. Oeltjen, Lake Elmo; Jeffrey S. Lindquist, Maple Grove, both of MN (US); Yoshihiro Kodama; Daisuke Asai, both of Hamamatsu (JP)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/509,749
(22) PCT Filed: Oct. 22, 1998
(86) PCT No.: PCT/US98/22396
§ 371 (c)(1),
(2), (4) Date: Jun. 14, 2000
(87) PCT Pub. No.: WO99/20708
PCT Pub. Date: Apr. 29, 1999

Related U.S. Application Data

(63) Continuation-in-part of application No. 08/957,290, filed on Oct. 24, 1997, now Pat. No. 5,912,295.
(60) Provisional application No. 60/063,021, filed on Oct. 23, 1997.
(51) Int. Cl.[7] .......................... C08L 53/02; C09J 153/02
(52) U.S. Cl. .................. 524/505; 524/271; 524/474; 524/484; 524/485; 524/486; 525/95; 525/99; 525/314; 428/355 BL; 156/327; 156/334

(58) Field of Search .................. 524/271, 505, 524/474, 484, 485, 486; 525/89, 95, 98, 99, 314; 428/355 BL; 156/327, 334

(56) References Cited

U.S. PATENT DOCUMENTS

| | | | | |
|---|---|---|---|---|
| 5,091,473 A | * | 2/1992 | Arashiro et al. | 525/92 |
| 5,149,741 A | * | 9/1992 | Alper et al. | 524/271 |
| H1402 H | * | 1/1995 | Chin et al. | 525/314 |
| 5,391,603 A | * | 2/1995 | Wessel et al. | 524/396 |
| 5,412,032 A | * | 5/1995 | Hansen et al. | 525/98 |
| 5,418,052 A | * | 5/1995 | Sugie et al. | 524/505 |
| 5,459,193 A | * | 10/1995 | Anderson et al. | 524/505 |
| 5,741,840 A | * | 4/1998 | Lindquist et al. | 524/505 |
| 5,912,295 A | * | 6/1999 | Deltjen et al. | 524/505 |
| 6,025,071 A | * | 2/2000 | Cameron et al. | 525/98 |

* cited by examiner

*Primary Examiner*—Peter Szekely
(74) *Attorney, Agent, or Firm*—Allison A. Johnson, P.A.

(57) ABSTRACT

This invention relates to a removable grade hot melt pressure sensitive adhesive comprising from about 5% to about 30% by weight of the adhesive of a block copolymer having styrene endblocks and ethylene/butylene or ethylene/propylene midblocks and having a coupling efficiency of less than about 65% and a melt index of greater than about 20 grams/10 minutes; from about 10% to about 50% by weight of the adhesive of at least one block copolymer having styrene endblocks and a coupling efficiency from about 65% to about 100%; from about 20% to about 60% by weight of the adhesive of a tackifying resin and from about 10% to about 40% by weight of the adhesive of a liquid plasticizing oil.

27 Claims, No Drawings

HOT MELT PRESSURE SENSITIVE ADHESIVE WHICH EXHIBITS MINIMAL STAINING

CROSS-REFERENCE TO RELATED APPLICATIONS

This Application is a 371 of PCT/US98/22396 filed Oct. 22, 1998 which claims benefit of Provisional No. 60/063,021 filed Oct. 23,1997 and is a continuation-in-part of application Ser. No. 08/957,290, filed Oct. 24, 1997, now U.S. Pat. No. 5,912,295.

FIELD OF THE INVENTION

This invention relates to a removable grade hot melt pressure sensitive adhesive based on a block copolymer having a high level of A-B diblock. The adhesive is characterized as being low in viscosity and exhibits minimal staining of substrates. The adhesive is useful where minimal staining of paper is desired especially in the bookbinding and labeling industries where the aesthetics of printed material is important.

BACKGROUND OF THE INVENTION

Hot melt pressure sensitive adhesives are usually based on a block copolymer such as styrene-ethylene/butylene-styrene, styrene-ethylene/propylene-styrene, styrene-isoprene-styrene and styrene-butadiene-styrene in combination with a tackifying resin and a plasticizing oil. Hot melt pressure sensitive adhesives can be divided into four general categories including permanent, semi-permanent, removable and freezer categories, each category having different adhesive characteristics. Permanent adhesives are designed to permanently adhere one substrate to another and provide either substrate failing or substrate distorting bonds. Semi-permanent adhesives are designed to be repositionable for a short period of time after application of one substrate to another. Freezer grade adhesives are designed to have good adhesion to substrates at temperatures of about −30° C.

Removable hot melt pressure sensitive adhesives are designed to allow separation of substrates at any time after application of one substrate to another without substrate failure or adhesive transfer. These adhesives are generally characterized as having low 180° peel values and high initial tack. These properties are typically achieved through the use of high levels of block copolymers, low levels of tackifying resin and high levels of a plasticizing oil. The block copolymer provides increased flexibility and a smooth, low peel value. The tackifying resin provides high tack, high adhesion and reduces viscosity. The plasticizing oil reduces peel values, viscosity and glass transition temperatures, increases flexibility and decreases the storage modulus.

To assure that the adhesive does not adhere too aggressively to the substrate and therefore assure its removability, it is necessary to utilize low levels of tackifying resin. This means that either the level of block copolymer or the level of oil must be increased. Increasing the concentration of block copolymer results in an increase in viscosity, whereas increasing the concentration of oil results in a product which stains the substrate.

The function of an oil is primarily to reduce the viscosity of the final product, plasticize the block copolymer, therefore increasing tackiness, and also to reduce the adhesive cost. However, the existence of high amounts of oil may result in an adhesive composition which allows some oil to migrate resulting in staining of substrates. The pressure sensitive properties of the adhesive also may deteriorate. Oil may be replaced with either liquid resins or liquid elastomers but these components also increase viscosities and peel values resulting in products which are not removable. This quality is undesirable for many labeling applications and for skin attachment adhesives. Liquid resins and liquid elastomers are often not as economically attractive as oils as well.

The block copolymers provide a medium for dissolution or suspension of the tackifying resin and the plasticizing oil. A hot melt pressure sensitive adhesive utilizing the proper amount of a plasticizer should retain a solid physical nature upon aging while having significant flexibility. However, the block copolymers will reach a point at which they can retain no more oil, the oil will then separate from the adhesive and bleed into the substrate causing staining of the substrate. Increasing the levels of block copolymer or increasing the molecular weight of the block copolymer typically allows for the utilization of higher levels of oil which is necessary when compounding a removable hot melt pressure sensitive adhesive.

There remains a need in the industry for a removable hot melt pressure sensitive adhesive that is low in viscosity and which does not stain the substrates to which it is applied. The current inventors have discovered a removable hot melt pressure sensitive adhesive composition which allows for very low viscosities and does not stain a substrate upon aging, even at high temperatures.

SUMMARY OF THE INVENTION

The present invention relates to a removable hot melt pressure sensitive adhesive comprising from about 5% to about 30% by weight of the adhesive of a block copolymer having styrene endblocks and ethylene/butylene or ethylene/propylene midblocks and having a diblock content of greater than about 35% and a melt index of greater than about 20 grams/10 minutes; from about 10% to about 50% by weight of the adhesive of at least one block copolymer having styrene endblocks and having a coupling efficiency from about 65% to about 100%; from about 20% to about 60% by weight of the adhesive of a tackifying resin and from about 10% to about 40% by weight of the adhesive of a liquid plasticizing oil.

These adhesives are characterized as having minimal staining of substrates, even at temperatures of about 60° C. They are further characterized by 180° peel values to stainless steel of less than about 2.0 pounds per linear inch (about 360 grams/cm) and preferably less than about 1.5 pounds per linear inch (about 270 grams/cm) and viscosities of preferably less than about 3500 cPs at about 175° C. and more preferably less than about 2500 cPs at 175° C.

The present invention further relates to a nonstaining hot melt adhesive comprising from about 10% to about 60% by weight of the adhesive of at least one block copolymer having styrene endblocks and isoprene midblocks, a styrene content of less than about 20 wt-% and a diblock content of greater than about 40 wt-%, from about 20% to about 70% by weight of the adhesive of at least one tackifying resin and from about 5% to about 40% by weight of the adhesive of at least one plasticizing oil. The resultant hot melt adhesive composition exhibits superior antibleeding properties.

Preferably the block copolymer has a styrene content of less than about 16% and a diblock content of greater than about 40% and preferably greater than about 50% by weight of the block copolymer.

The present invention further relates to a hot melt adhesive having superior stain resistance comprising from about 10% to about 60% by weight of at least one block copolymer having styrene endblocks and midblocks selected from the group consisting of isoprene, ethylene/butylene and ethylene/propylene, from about 20% to about 70% by weight of the adhesive of at least one tackifying resin and from about 5% to about 40% by weight of the adhesive of at least one plasticizing oil. The hot melt adhesive exhibits superior anti-bleeding properties.

Preferably the block copolymer is linear and has a styrene content of greater than about 20 wt-% of the block copolymer and preferably greater than about 25% by weight of the block copolymer.

DETAILED DESCRIPTIONS

The present invention may utilize substantially saturated block copolymers including those having styrene endblocks and ethylene/butylene or ethylene/propylene midblocks and having a coupling efficiency of less than about 65% (or an A-B diblock content of greater than about 35%), a coupling efficiency of preferably less than about 50% and more preferably less than about 35%. The coupling efficiency refers to the ratio of A-B diblock to A-B-A triblock. A block copolymer having a coupling efficiency of less than about 65% will have a diblock content of greater than about 35% by weight of the block copolymer and an A-B-A triblock content of less than about 65% by weight of the block copolymer. The block copolymers useful herein preferably have a melt index of greater than about 20 grams/10 minutes, more preferably greater than about 30 g/10 min, even more preferably greater than about 50 g/10 min. and most preferably greater than about 60 g/10 min. The styrene content is preferably from about 10% to about 40% by weight of the block copolymer, more preferably from about 10% to about 35% by weight and most preferably from about 10% to about 30% by weight of the block copolymer. Examples may include Kraton® G 1726, a styrene-ethylene/butylene-styrene (hereinafter SEBS) block copolymer having about 70% A-B diblock by weight of the block copolymer, 30% styrene by weight of the block copolymer and a melt index of 65 grams/10 minutes. Styrene-ethylene/propylene-styrene (hereinafter SEPS) block copolymers are available from Kuraray Company, Ltd in Tokyo, Japan under the tradename of Septon® and may also be utilized providing the block copolymer meets the diblock requirement. These block copolymers are useful from about 5 wt-% to about 30 wt-% of the adhesive.

The present invention further utilizes block copolymers having styrene endblocks and a coupling efficiency from about 65% to about 100% (a linear block copolymer) in combination with the block copolymers listed above. The midblocks are preferably ethylene/butylene, ethylene/propylene or isoprene and are more preferably ethylene/butylene or ethylene/propylene. The styrene content is preferably between about 10% and about 40% by weight of the block copolymer, more preferably from about 10% to about 35% by weight, even more preferably from about 10% to about 30% by weight and most preferably from about 10% to about 25% by weight. The melt index of these block copolymers is preferably greater than about 5 g/10 min. and more preferably greater than about 10 g/10 min. Useful examples include Kraton® 1652 available from Shell Chemical Co., a 100% linear SEBS block copolymer having about 29% styrene and a melt index of about 10 g/10 min. These block copolymers are useful from about 5 wt-% to about 50 wt-% of the adhesive, preferably from about 10 wt-% to about 50 wt-% of the adhesive and more preferably from about 10 wt-% to about 40 wt-% of the adhesive.

In an alternative embodiment, block copolymers having styrene endblocks and isoprene midblocks are useful to the present invention. These block copolymers preferably have A-B diblock contents of greater than about 35 wt-% of the block copolymer, more preferably greater than about 40 wt-%, even more preferably from about 40 wt-% to about 100 wt-%, and most preferably from about 40 wt-% to about 80 wt-%. The styrene contents are preferably less than about 30 wt-%, more preferably less than about 25 wt-%, even more preferably less than about 20 wt-%, even more preferably from about 5 wt-% to about 20 wt-% of the adhesive, even more preferably from about 5 wt-% to about 17 wt-%, even more preferably less than about 16 wt-% and most preferably from about 5 wt-% to about 16 wt-%. In a more specific preferred embodiment, the styrene content is less than about 20 wt-% of the block copolymer and the diblock content is greater than about 50 wt-%. The block copolymers preferably have a molecular weight as measured by gas permeation chromatography, of greater than about 150,000 grams/mole, more preferably greater than about 175,000 grams/mole and even more preferably greater than about 200,000 grams/mole. These block copolymers are useful from about 10 wt-% to about 60 wt-%, preferably from about 20 wt-% to about 40 wt-% and most preferably from about 25 wt-% to about 35 wt-% of the adhesive.

Examples of useful SIS block copolymers include JSR-SIS-5000, a linear SIS block copolymer having about 15 wt-% styrene and a diblock content of about 70 wt-% available from Japan Synthetic Rubber Co.; Quintac® SL-113, a linear SIS block copolymer having 15 wt-% styrene and a diblock content of about 79 wt-% available from Nippon Zeon; Quintac® 3433, a linear SIS block copolymer having about 16 wt-% styrene and a diblock content of about 59 wt-%; and Quintac SH-108; a linear SIS block copolymer having 25 wt-% styrene and a diblock content of about 41 wt-%. The Kraton® D series of SIS block copolymers, available from the Shell Chemical Co. in Houston, Tex. is also useful to the present invention providing the block copolymers meet the requirements specified.

In another embodiment, if the styrene-isoprene-styrene block copolymer is linear (A-B-A), the styrene content is preferably greater than about 20 wt-%, if the diblock content is less than about 30 wt-% of the block copolymer.

If the block copolymer is a linear block copolymer having styrene endblocks and ehtylene/propylene or ethylene/butylene midblocks, the styrene content is preferably greater than about 20 wt-% of the block copolymer and more preferably greater than about 25 wt-% of the block copolymer. It appears that if the midblocks are ethylene/propylene or ethylene/butylene, the molecular weight of the block copolymer may be less than about 150,000 g/mole ($M_N$) and even less than 120,000–125,000 and the resultant adhesive will still exhibit excellent anti-bleeding properties.

Examples of other useful block copolymers include Quintac® 3422, a linear SIS having a diblock content of about 10%, a molecular weight $M_N$, of about 203,000 and a styrene content of about 15%; Vector ® 4113 D supplied by Dexco Polymer Corp., a linear SIS having a diblock content of about 22%, an $M_N$ of about 172,000 and a styrene content of about 15%; Kraton D-1111, a linear SIS having a diblock content of about 18%, an $M_N$ of about 180,000 and a styrene content of about 21% by weight of the copolymer; Europrene® Sol T-190 supplied by Enichem Elastomers, a linear SIS having a diblock content of about 27%, an $M_N$ of about 182,000 and a styrene content of about 25% by weight of the copolymer; Vector®D 4211 D, a 100% linear block copolymer having no diblock, an $M_N$ of about 123,000 and a styrene content of about 29%; Kraton G-1650, a linear styrene-ethylene/butylene-styrene block copolymer having a diblock content of 0%, an $M_N$ of about 113,000 and a styrene content of about 28%; and Septon® 4033 supplied by Kuraray, Japan, a linear styrene-ethylene/propylene-styrene block copolymer having a diblock content of 0%, an $M_N$ of about 108,000 and a styrene content of about 30% by weight of the copolymer.

The tackifying resins useful herein are preferably those having a Ring and Ball softening point of less than about 120° C., more preferably less than about 110° C. and most preferably less than about 100° C. The tackifiers useful herein include aromatic, aliphatic and cycloaliphatic hydrocarbons, modified hydrocarbons and hydrogenated versions thereof; terpenes, modified terpenes and hydrogenated versions thereof and rosins, modified rosins and hydrogenated versions thereof; and mixtures thereof. These tackifying resins are generally commercially available with differing levels of hydrogenation. Useful resins include Eastotac® H-115 and more preferably Eastotac® H-100, partially hydrogenated cycloaliphatic petroleum hydrocarbon resins with softening points of 115° C. and 100° C., respectively. These resins are available in the E grade, R grade, L grade and W grade indicating increasing levels of hydrogenation and therefore lighter color respectively. They are available from Eastman Chemical Co. in Kingsport, Tenn. Other available resins include ECR 177 C having a melt point of about 85° C.; Escorez® 5300 and Escorez® 5400, partially hydrogenated cycloaliphatic petroleum hydrocarbon resins with softening points of about 100° C. and Escorez® 5600, a partially hydrogenated aromatic modified petroleum hydrocarbon resin having a softening point of about 100° C. and all available from Exxon Chemical Company in Houston, Tex. There are many grades of Escorez® hydrocarbon resins available from Exxon having different base feedstocks, softening points and levels of hydrogenation. Other useful resins include Wingtack® Extra which is an aliphatic, aromatic petroleum hydrocarbon resin, Wingtack® 86, an aromatic modified synthetic polyterpene hydrocarbon resin and Wingtack® 95, a synthetic polyterpene all having softening points of less than about 100° C. and available from Goodyear Tire and Rubber Co. in Akron, Ohio. Further examples include Hercolite® 2100 which is a partially hydrogenated cycloaliphatic petroleum hydrocarbon resin available from Hercules Inc. in Wilmington, Del.; MAB 275 Resin which is an aromatically modified aliphatic hydrocarbon resin also available from Hercules Inc. and Zonatac® 105 Lite which is a styrenated terpene hydrocarbon resin, made from d-limonene and available from Arizona Chemical in Panama City, Fla.

In one preferred embodiment, Zonatac® 105 lite, an aromatic hydrocarbon is used from about 30 wt-% to about 60 wt-%. In this embodiment, from about 15 wt-% to about 35 wt-% of a plasticizing oil, and preferably from about 20 wt-% to about 30 wt-% of a plasticizing oil is utilized. In this case, the plasticizing oil has a greater amount of paraffinic character than naphthenic. The block copolymer is preferably from about 20 wt-% to aobut 40 wt-% of the adhesive and preferably from about 25 wt-% to about 35 wt-%.

Useful modified rosins include Sylvatac® 1103 and Zon-ester® 100 available from Arizona Chemical and Permalyn® 305 available from Hercules which are all pentaerythritol rosin esters. All of these resins also have softening points of less than about 100° C. Sylvatac® 1085, an 85° C. softening point glycerol rosin ester of tall oil is another example of a useful rosin based tackifier. It should be noted that there are numerous types of rosins and modified rosins with differing levels of hydrogenation including gum rosins, wood rosins, tall-oil rosins, distilled rosins, dimerized rosins and polymerized rosins. Some specific modified rosins include glycerol and pentaerythritol esters of wood rosins and tall-oil rosins.

Examples of useful pure alphamethyl styrene resins are Kristalex® 3070 (70° C. softening point), 3085 (85° C. softening point) and 3100 (100° softening point) available from Hercules in Wilmington, Del.

The preferred resins are at least partially hydrogenated hydrocarbon resins and rosin ester resins, especially of gum rosin, having softening points of preferably less than about 100° C. and more preferably less than about 90° C. These resins are useful from about 20% to about 60% by weight of the composition, preferably from about 25% to about 55% by weight and more preferably from about 25% to about 45% by weight of the composition. Plasticizers, which are typically fluid, are necessary to the present invention. Plasticizers provide fluidity to the adhesives and decrease viscosities, peel values and glass transition temperatures. The plasticizers useful herein may include mineral and petroleum based hydrocarbon oils. The oils used are primarily hydrocarbon oils which are low in aromatic content are paraffinic or naphthenic in character. The oils may comprise both naphthenic and paraffinic character. The oils are preferably low in volatility, transparent, and have as little color and odor as possible. This invention also contemplates the use of vegetable oils and their derivatives and similar plasticizing liquids. The liquid plasticizer serves the purpose of reducing of the melt viscosity of the hot melt composition for ease of application and also to plasticize the block copolymer which may increase the tackiness of an adhesive composition.

Examples of useful plasticizers include Calsol® 5120, a naphthenic petroleum based oil available from Calumet Lubricants Co. in Indianapolis, Ind.; Kaydol® White Mineral Oil, a paraffinic mineral oil available from Witco Corp. in New York, N.Y. One skilled in the art would recognize that any generic 500 second or 1200 second naphthenic process oils would also be useful. Primarily paraffinic plasticizing oils appear to be less compatible with those block copolymers having butadiene midblocks. These plasticizers are useful in amounts of from about 5% to about 40% by weight of the adhesive, preferably from about 10% to about 35% by weight of the adhesive, more preferably from about 15% to about 30% by weight and even more preferably from about 20% to about 30% by weight of the adhesive. Lower levels of plasticizer can result in a pressure sensitive adhesive which has peels values which are too high and is therefore more of a permanent grade pressure sensitive adhesive. The viscosity of the adhesive may also be too high resulting in poor machinability. Higher levels of plasticizer result in plasticizer migration and staining of substrates. Historically, to retain low peel values and removability, high levels of plasticizers must be used. This results in products which are not resistant to staining of the substrates. Polymers having high A-B diblock content have been found to poorly retain oil in the system resulting in products that will stain substrates due to plasticizer migration.

Other optional ingredients may also be added to the adhesives of the present invention providing that these ingredients do not adversely affect the removability and nonstaining characteristics of the adhesive. Such other ingredients may include other block copolymers; homopolymers, copolymers and terpolymers of ethylene including ethylene vinyl acetate copolymers, ethylene n-butyl acrylate copolymers and ethylene methylacrylate copolymers; interpolymers of ethylene having at least one $C_3$ to $C_{20}$ alphaolefin and homopolymers, copolymers and terpolymers of propylene to mention only some examples.

Other liquid ingredients include liquid elastomers such as polybutene and polyisobutylene as well as liquid tackifying resins such as liquid rosin esters and liquid hydrocarbon resins. These liquid ingredients are useful in amounts up to about 10% by weight of the adhesive.

These optional ingredients may be added in small amounts providing that they do not adversely affect the important characteristics for removability such as the low peel value and do not adversely affect the viscosity of the resultant adhesive composition. For instance, replacing too much plasticizing oil with liquid polybutene may result in products have peel values that are too high for removability and viscosities which are too high for application.

A stabilizer or antioxidant is also preferably used in hot melt adhesives. These compounds are added to protect the adhesive from degradation caused by reaction with oxygen induced by such things as heat, light, or residual catalyst from the raw materials such as the tackifying resin. Such antioxidants are commercially available from Ciba-Geigy in Hawthorne, N.Y. and include Irganox® 565, 1010 and 1076 which are hindered phenols. These are primary antioxidants which act as radical scavengers and may be used alone or in combination with other antioxidants such as phosphite antioxidants like Irgafos® 168 available from Ciba-Geigy. Phosphite catalysts are considered secondary catalysts and are not generally used alone. These are primarily used as peroxide decomposers. Other available catalysts are Cyanox® LTDP available from Cytec Industries in Stamford, Conn., and Ethanox® 1330 available from Albemarle Corp. in Baton Rouge, La. Many such antioxidants are available either to be used alone or in combination with other such antioxidants. These compounds are added to the hot melts in small amounts and have no effect on other physical properties. Other compounds that could be added that also do not affect physical properties are pigments which add color, or fluorescing agents, to mention only a couple. Additives like these are known to those skilled in the art.

The resultant hot melt pressure sensitive adhesives are removable in nature, having 180° peel values to stainless steel of less than about 2.0 pounds per linear inch (about 360 g/cm) and preferably less than about 1.5 pounds per linear inch (about 270 g/cm). The viscosities of the resultant compositions are preferably less than about 3500 cPs at about 175° C. and more preferably less than about 2500 cPs at about 175° C.

Stain resistance has been achieved with adhesive compositions which are high in viscosity. Adhesive compositions high in viscosity generally employ high molecular weight polymers and/or low concentrations of liquid plasticizer. Higher molecular weight polymers will, for the most part, solvate a greater amount of liquid plasticizer, although this will also depend on the ratio of the size of the styrene endblocks to the size of the conjugated diene midblocks and the type of plasticizer which is used. For instance, a higher ratio of conjugated diene midblock will allow for a greater amount of a midblock associating plasticizer such as naphthenic oils. However, the use of a high molecular weight block copolymer or a lower concentration of the liquid component is not amenable to removable adhesive applications since removable nature of the hot melt pressure sensitive adhesive is easily disrupted by decreasing the amount of the liquid component present. Further, although high polymer contents can help to maintain the removable nature, viscosity is concurrently increased. Surprisingly, the present inventors have found a removable grade hot melt pressure sensitive adhesive which is low in viscosity and which has superior stain resistance.

These compositions may be coated onto a first substrate using any coating method available such as roll coating, slot die coating and gravure coating. These coatings may be in a continuous or in an interrupted pattern. The compositions may also be applied using extrusion equipment such as that manufactured by Nordson Corp. in Atlanta, Ga. and they be applied using spraying techniques and fiberization (discontinuous techniques) and screen printing (pattern coating). Typical temperatures of application may be from about 120° C. to about 190° C., with temperatures from about 120° C. to about 175° C. being preferable.

A release liner may be adhered to the other side of the adhesive coating to protect the coating from dust particles and other airborne contaminants as well as to prevent the coating from adhering undesirably to equipment, skin and other substrates prior to use. The release liner may then be removed at a later date and the first substrate adhered to a second. Such applications where this method may be used would include labeling and sticker applications. For instance, stickers and labels which are adhered to new electronic equipment and appliances. Labels and stickers are used for adhering to all types of newly purchased articles for identification and sale for what is known in the industry as "removable store shelf marking." The consumer desires that these labels and stickers be freely removable at a later date without leaving behind a residue on the articles.

Anything in contact with paper tends to stain the paper after removal and it is a surprising result that these adhesives have no tendency to stain the paper substrates after they have been removed.

These adhesives may also be useful for disposable nonwovens and for medical applications such as skin attachment adhesives. Some applications include positioning for feminine hygiene articles including pantiliners, adult incontinent articles, diapers and tapes and for medical applications including plasters, gauze and bandages. In this case, they are permanently adhered to the article which is constructed and removably adhered to a surface such as fabric or skin without adhesive transfer or staining. In these applications, the adhesive may be continuously or discontinuously coated onto at least one surface of an article whereby the adhesive will be permanently adhered to the article. The article will then later be removably attached to a surface such as skin or fabric in order to secure an article for some period of time without causing skin irritation, adhesive residue or adhesive transfer to the surface when removal of the article is desired.

Other applications where these removable grade pressure sensitive adhesives may be used is for bookbinding applications including what is known in the art as tipping. In this instance, labels, coupons, advertisements or samples of items such as cosmetic products, perfumes, medicinal items such as aspirin, Tylenol® or Advil® for instance, and foodstuffs such as spices may be temporarily adhered to a magazine page which will then later be removed by the purchaser of the magazine. These items may be contained in plastic such as polyethylene or polypropylene. It is desired that these items be cleanly removed from the magazines without tearing fiber from the magazine page. It is also desired that the adhesive remain with the substrate to which it was originally coated and that it does not remain on the magazine. A further requirement is that the adhesive does not stain either the substrate to which it is applied. It is very difficult to avoid staining of the paper in a magazine or book and it is a surprising result of the present invention that these compositions have superior stain resistance over other commercially available adhesives. The adhesive, in this case, is most commonly applied in bead form via the nozzle extrusion method.

EXAMPLES

Test Methods

The samples were prepared using a ¼ gallon (or approximately 1 liter) sigma blade mixer manufactured by Aaron Processing Equipment Co., Inc. located in Bensenville, Ill. Temperatures were maintained between about 150° C. and about 175° C. Approximately 10% to about 20% by weight of the adhesive of tackifying resin is initially added to the mixer and allowed to melt. The block copolymer(s) and antioxidant(s) are then added to the molten resin. The resulting mixture is allowed to shear for approximately ½ hour or until homogeneous and smooth. The remaining tackifying resin is then slowly added to the mixture followed by the plasticizing oil. It is particularly important to add the oil slowly as phase separation can occur at this point. One of skill in the art would recognize that there are a vast number of high shear sigma blade mixers of all sizes manufactured by various companies and that processing must be adjusted accordingly.

1. Melt Viscosities

The melt viscosities of the hot melt adhesives were determined on a Brookfield Thermosel Viscometer Model DV-II+ using a number 27 spindle.

2. 180° Peel Adhesion To Stainless Steel

Peel values were determined using test method #PSTC-1. About 1 mil adhesive film is coated onto polyester (Mylar®) film out of a solvent blend using a Baker Applicator. Samples are then cut into 1 inch×8 inch (2.54 cm×20.32 cm) strips for determining peel values.

3. Staining Test A

This test is used to determine the stain resistance of hot melt pressure sensitive adhesives. An adhesive film having a thickness of about 0.25 g/m² or about 1 mil was applied on polyethylene or polyester (Mylar®) and a release liner was placed over the adhesive film. A film may be made by first dissolving the adhesive into a solvent such as toluene and then drawing down the adhesive using a metal draw down bar. If a solvent is used, the resultant film must be allowed to dry for about 24 hours. The amount of staining for any given adhesive is a function of the coat weight so it is important to use the same coat weight for each adhesive tested. The composite was cut into 3"×7" (7.62×17.78 cm) strips and the release liner removed. A sheet of high-speed xerographic copy paper was then placed over the adhesive and a 4½ pound (2043 grams) roller is drawn over the composite, once forward and once backward. These samples are then placed in an oven at about 50° C. for up to 96 hours. The samples are then checked at least once, and usually twice, every 24 hours and rated using the following scale:

1=no visible staining; pass
2=very faint staining; pass
3=visible but moderate staining; fail
4=visible staining; fail
5=very visible and excessive staining; fail The appearance of the paper when there is no visible staining is such as it was before application of the adhesive strip. With very faint staining as under 2, some darkening may be seen around the edge of the adhesive strip, or very faint spots or faint darkening in only some areas in the paper. Visible but moderate staining, 3, refers to a spotted appearance, "blotchiness" or darkening of some areas on the paper. Visible staining refers to a more continuous pattern of darkening and an actual development of transparency of the paper as it is stained. Very visible and excessive staining refers to a development of transparency of the paper due to staining. There is no longer any spotting or "blotchiness" but rather there is a continuous darkening throughout the entire test strip. The boundaries of the adhesive strip are now clearly visible in the paper. There may be even a continuation of darkening of the paper beyond the border of the adhesive strip as the adhesive bleeds.

4. Staining Test B

The adhesive is combined with toluene solvent in a ratio of 1:1 and is mixed overnight. The mixture is then coated on polyethylene terephthalate film (PET) at a coating weight of about 30 μm. The toluene is then allowed to evaporate in a circulating oven at 120° C. for 5 minutes.

The adhesive coated PET film is then placed in contact with fine paper and is stored in an oven at 50° C. for 4 weeks. The degree to which the oil penetrated the paper is observed and the samples were ranked according to the following scale:

(No bleeding) Ex—A—B—C—D (much bleeding)

A rating of excellent is a sample which shows no substrate staining. A is very slight staining of the substrate but still very good. B is acceptable but some staining of the paper is seen.

TABLE I

| | Comparative Examples | | | | | | | |
|---|---|---|---|---|---|---|---|---|
| | A | B | C | D | E | F | G | H |
| ECR 177 C hydrocarbon resin | — | — | — | 44.5 | 44.5 | — | 44.5 | 64.5 |
| Eastotac ® H130R hydrocarbon resin | — | 39.5 | — | — | — | — | — | — |
| Eastotac ® H100R hydrocarbon resin | 39.5 | — | — | — | — | — | — | — |
| Regal Rez ® 1094 hydrocarbon resin | — | — | — | — | — | 17.5 | — | — |
| Arkon ® P-115 hydrocarbon resin | — | — | — | — | — | 17.5 | — | — |
| Kraton ® G1726 SEBS copolymer | — | — | — | — | — | 30.0 | 30.0 | 5.0 |

TABLE I-continued

| | Comparative Examples | | | | | | | |
|---|---|---|---|---|---|---|---|---|
| | A | B | C | D | E | F | G | H |
| Kraton ® G1652 SEBS copolymer | 25.0 | 25.0 | 25.0 | 20.0 | 20.0 | — | — | 10.0 |
| Kraton ® G1657 SEBS copolymer | — | — | — | 5.0 | — | — | — | — |
| Kraton ® D1117P SIS copolymer | — | — | — | — | 7.5 | — | — | — |
| Kaydol ® Oil white mineral oil | 35.0 | 35.0 | 35.0 | 30.0 | 27.5 | — | 25.0 | 20.0 |
| Parapol ® 1300 liquid polybutene | — | — | — | — | — | 34.5 | — | — |
| MAB 275 Resin hydrocarbon resin | — | — | 39.5 | — | — | — | — | — |
| Visc.@ 350° F. cPs | 1550 | 1970 | 1720 | 2620 | 2025 | 2550 | 755 | 375 |
| SAFT (° C.) | 72 | 74 | 70 | 64 | 66 | 80 | — | — |
| 1800 Peel lb/in | 0.12 | 0.39 | 0.10 | 0.18 | 0.20 | 6.0 | 1.4 | 4.4 |
| (grams/cm) | (21.4) | (69.7) | (17.9) | (32.2) | (35.7) | (1072) | (250) | (786) |
| Staining Test A | 3/fail | 3/fail | 4/fail | 5/fail | 5/fail | 2/pass | 3/fail | 5/fail |

*All samples contain 0.5% Irganox® 1010 hindered phenolic antioxidant from Ciba-Geigy.

TABLE II

| | Examples | | | | | | | |
|---|---|---|---|---|---|---|---|---|
| | 1 | 2 | 3 | 4 | 5 | 6 | 7 | 8 |
| ECR 177 C hydrocarbon resin | 44.5 | 49.5 | 24.5 | 39.5 | 34.5 | 19.5 | 14.5 | 54.5 |
| Kraton ® G 1652 SEBS copolymer | 20.0 | 15.0 | 40.0 | 5.0 | 10.0 | 20.0 | 40.0 | 10.0 |
| Kraton ® G 1726 SEBS copolymer | 10.0 | 15.0 | 5.0 | 30.0 | 30.0 | 20.0 | 5.0 | 15.0 |
| Kaydol ® White Mineral Oil | 25.0 | 20.0 | 30.0 | 25.0 | 25.0 | 40.0 | 40.0 | 20.0 |
| 180° Peel lb/in | 0.25 | 0.6 | 0.1 | 0.5 | 0.4 | <0.1 | <0.1 | 2.0 |
| (grams/cm) | (44.7) | (107) | (17.9) | (89.4) | (71.5) | (<17.9) | (<17.9) | (357) |
| Visc @ 175° C. (cPs) | 2430 | 2620 | 23570 | 1445 | 3400 | 3860 | 26430 | 1205 |
| Staining Test A | 1/pass | 1/pass | 1/pass | 2/pass | 1/pass | 1+/pass | 1/pass | 2/pass |

Each sample contains 0.5% Irganox® 1010 hindered phenolic antioxidant from Ciba-Geigy.

Comparative Examples A, B and C illustrate the use of a 100% linear styrene-ethylene/butylene-styrene (SEBS) block copolymer and various resins. These are typical removable grade products in that the low viscosity and low peel value are maintained through the use of high amounts of plasticizer and 100% linear block copolymers. These products fail the stain resistance test.

Comparative Examples D illustrates the use of a 100% linear SEBS block copolymer used in combination with an SEBS block copolymer having a moderate amount of diblock. This product fails the stain resistance test.

Comparative Example E illustrates the use of a 100% linear SEBS block copolymer used in combination with a styrene-isoprene-styrene block copolymer. This product also fails the stain resistance test.

Comparative Example F illustrates the use of a high diblock copolymer and a liquid polybutene elastomer rather than a hydrocarbon oil. While this product passes the stain resistance test, it is no longer removable having a peel value of about 6.0 pli (about 1072 g/cm).

Comparative Example G illustrates a product utilizing only a high diblock SEBS block copolymer. This product fails the stain resistance test.

Comparative Example H illustrates the result of having too much tackifying resin. The resultant product is no longer removable having a peel value of greater than about 4 pli (about 715 g/cm). This product also had extremely poor stain resistance.

Example 1 illustrates the composition of the present invention which is a removable grade product having a combination of a high diblock styrene-ethylene/butylene-styrene block copolymer and a 100% linear SEBS block copolymer allowing a product with a lower oil content which maintains a low viscosity and has excellent stain resistance.

Example 2 illustrates a product of the present invention which meets the viscosity requirement and passes the stain resistance test.

Examples 3 and 7 illustrate a high polymer content and low tackifying resin content. These products exhibit the high range of linear SEBS block copolymer and the low range of the high diblock SEBS block copolymer and while the products are removable and pass the stain resistance test they are undesirably high in viscosity.

Examples 4 and 5 illustrate the high range of the high diblock SEBS block copolymer and the low range of the 100% linear SEBS block copolymer.

Example 6 illustrate a high content of oil and midrange amounts of both the high diblock SEBS block copolymer and the 100% linear block copolymer.

Example 8 illustrates a low amount of total polymer and the higher range of tackifying resin.

TABLE III

| Example | 9 | 10 | 12 | 12 |
|---|---|---|---|---|
| JSR-SIS-5000 SIS block copolymer | 25 wt-% | — | — | — |
| Quintac SL-113 SIS block copolymer | — | 25 wt-% | — | — |
| Quintac ® 3433 SIS block copolymer | — | — | 25 wt-% | — |
| Quintac ® SH-108 SIS block copolymer | — | — | — | 25 wt-% |
| Zonatac ® 105 Lite hydrocarbon resin | 50 wt-% | 50 wt-% | 50 wt-% | 50 wt-% |
| 500 sec process oil | 25 wt-% | 25 wt-% | 25 wt-% | 25 wt-% |
| Staining Test B | A | Ex | A | Ex |

TABLE IV

Comparative Examples I–O

| | Comparative Ex | | | | | | |
|---|---|---|---|---|---|---|---|
| | I | J | K | L | M | N | O |
| Kraton ® D-1117 SIS | 25% | — | — | — | — | — | — |
| Kraton ® D-1112 SIS | — | 25% | — | — | — | — | — |
| Quintac ® 3421 SIS | — | — | 25% | — | — | — | — |
| Europrene ® Sol T-190 (SIS) | — | — | — | 25% | — | — | — |
| Vector ® 4114D SIS | — | — | — | — | 25% | — | — |
| JSR-SIS-5000 SIS | — | — | — | — | — | 25% | — |
| Kraton ® D-1117 SIS | — | — | — | — | — | — | 25% |
| Zonatac ® 105 Lite Aromatic HC | 50% | 50% | 50% | 50% | 50% | 50% | 50% |
| 500 Sec Proc Oil | 25% | 25% | 25% | 25% | 25% | 25% | 25% |
| Staining Test B | C | D | C | D | D | C | D |

TABLE V

Comparative Examples P–S

| Comparative Ex | P | Q | R | S |
|---|---|---|---|---|
| Vector ® 4111D SIS | 25% | — | — | — |
| Quintac ® 3450 SIS | — | 25% | — | — |
| Vector ® 4261D SBS | — | — | 25% | — |
| Asaprene ® T-420 SBS | — | — | — | 25% |
| Zonatac ® 105 Lite | 50% | 50% | 50% | 50% |
| 500 Sec Proc Oil | 25% | 25% | 25% | 25% |
| Staining Test B | C | D | C | C |

TABLE VI

Examples

| | Example | | | | | | |
|---|---|---|---|---|---|---|---|
| | 13 | 14 | 15 | 16 | 17 | 18 | 19 |
| Kraton ® D-1111 (SIS) | 25% | — | — | — | — | — | — |
| Europrene ® Sol T 192 (SIS) | — | 25% | — | — | — | — | — |
| Vector ® 4211D SIS | — | — | 25% | — | — | — | — |
| Kraton ® G-1650 SEBS | — | — | — | 25% | — | — | — |
| Septon ® 4033 SEPS | — | — | — | — | 25% | — | — |
| Quintac ® 3422 SIS | — | — | — | — | — | 25% | — |
| Vector ® 4113D SIS | — | — | — | — | — | — | 25% |
| Zonatac ® 105 Lite aromatic hydrocarbon | 50% | 50% | 50% | 50% | 50% | 50% | 50% |
| 500 sec proc oil | 25% | 25% | 25% | 25% | 25% | 25% | 25% |
| Staining Test B | B | B | Ex | Ex | Ex | Ex | Ex |

A B rating is passing, although marginally, while excellent reflects the fact that no staining was seen.

What is claimed is:

1. A hot melt pressure sensitive adhesive comprising:

a. from about 5% to about 30% by weight of the adhesive of at least one block copolymer having styrene end-blocks and ethylene/butylene or ethylene/propylene mid-blocks and having a diblock content of greater than 35%, a coupling efficiency of less than about 50%, a melt index greater than about 20 grams/10 minutes, and a styrene content of from about 10 wt-% to about 30 wt-%, b. from about 5% to about 50% by weight of the adhesive of at least one block copolymer having styrene end-blocks, a coupling efficiency from about 65% to about 100%; from about 10% to about 40% by weight of the adhesive of a liquid plasticizing oil; and c. from about 20% to about 60% by weight of the adhesive of a tackifying resin, said adhesive has a 180° peel to stainless steel of less than about 2.0 pounds per linear inch (about 360 g/cm) and exhibits minimal staining to paper.

2. The adhesive of claim 1 comprising from about 10% to about 50% by weight of the adhesive of at least one block copolymer having styrene endblocks and a coupling efficiency from about 65% to about 100%.

3. A removable label comprising a substrate coated on at least one surface with a hot melt pressure sensitive adhesive comprising a. from about 5% to about 30% by weight of the adhesive of at least one block copolymer having styrene end-blocks and ethylene/butylene or ethylene/propylene midblocks and having a coupling efficiency of less than about 50% and a melt index greater than about 20 grams/10 minutes;

b. from about 5% to about 50% by weight of the adhesive of at least one block copolymer having styrene end-blocks and a coupling efficiency from about 65% to about 100%;

c. from about 10% to about 40% by weight of the adhesive of a liquid plasticizing oil; and d. from about 20% to abut 60% by weight of the adhesive of a tackifying resin; wherein the resultant adhesive has a 180° peel to stainless steel of less than about 2.0 pounds per linear inch (about 360 g/cm) and exhibits minimal staining to paper.

4. An article adhered to a magazine page through "tipping" with a removable hot melt pressure sensitive adhesive comprising;
   a. from about 5% to about 30% by weight of the adhesive of at least one block copolymer having styrene endblocks and ethylene/butylene or ethylene/propylene midblocks and having a coupling efficiency of less than about 50% and a melt index greater than about 20 grams/10 minutes;
   b. from about 5% to about 50% by weight of the adhesive of at least one block copolymer having styrene endblocks and a coupling efficiency from about 65% to about 100%;
   c. from about 10% to about 40% by weight of the adhesive of a liquid plasticizing oil; and
   d. from about 20% to about 60% by weight of the adhesive of a tackifying resin; wherein the resultant adhesive has a 180° peel to stainless steel of less than about 2.0 pounds per lineal inch (about 360° g/cm) and exhibits minimal staining to paper.

5. The adhesive of claim 1 wherein said adhesive has a 180° peel to stainless steel of less than about 1.5 pounds per linear inch (about 270 g/cm).

6. The adhesive of claim 1 wherein said adhesive exhibits no visible staining to paper.

7. The adhesive of claim 1 wherein b) is a 100% linear styrene-ethylene/butylene-styrene block copolymer.

8. The adhesive of claim 1 wherein a) has a diblock content of about 70% and a styrene content of about 30% by weight of the block copolymer.

9. The adhesive of claim 1 wherein the tackifying resin has a softening point of less than about 100° C.

10. A non-staining hot melt adhesive that can be coated on a label or sticker, applied to a substrate, and removed without leaving a residue behind or causing more than acceptable staining, comprising:
   a. from about 25% to about 35% by weight of the adhesive of at least one block copolymer having styrene endblocks and isoprene midblocks, a styrene content of 5–16 wt-%, a diblock content of greater than about 40 wt-%, and a molecular weight of greater than 200,000;
   b. from about 20% to about 70% by weight of the adhesive of at least one tackifying resin; and
   c. from about 5% to about 40% by weight of the adhesive of at least one plasticizing oil.

11. The hot melt adhesive of claim 10 wherein said at least one block copolymer has a styrene content of less than about 16 wt-% of the block copolymer.

12. The adhesive of claim 10 wherein said at least one block copolymer has a diblock content of greater than about 50 wt-% of the block copolymer.

13. A hot melt adhesive characterized by causing minimal staining and having at least acceptable anti-bleeding properties when evaluated in accordance with Staining Tests A and B herein, comprising;
   a. from about 10% to about 60% by weight of at least one block copolymer from about 10% to about 60% by weight of at least one block copolymer having midblocks selected from the class consisting of ethylene/butylene and ethylene/propylene, a melt index greater than about 30 g/10 minutes, a coupling efficiency less than about 35% a styrene content of from about 10% to about 30% by weight of the copolymer, and a molecular weight of less than 150,000 g/mole;
   b. from about 25% to about 45% by weight of the adhesive of at least one tackifying resin having a softening point less than 100° C.; and
   c. from about 20% to about 30% by weight of the adhesive of at least one plasticizing oil.

14. The adhesive of claim 13 wherein said block copolymer is linear.

15. The adhesive of claim 13 wherein the styrene content is greater than about 25% by weight of the block copolymer.

16. The label of claim 3 wherein the adhesive has a 180° adhesion to stainless steel of less than about 1.5 pounds per linear inch (about 270 g/cm).

17. The label of claim 3 wherein the adhesive exhibits no visible staining to paper.

18. The label of claim 3 wherein block copolymer component b) is a 100% linear styrene-ethylene/butylene-styrene block copolymer.

19. The label of claim 3 wherein block copolymer a) has a diblock content of about 70% and a styrene content of about 30% by weight of the block copolymer.

20. The label of claim 3 wherein the tackifying resin has a softening point of less than 100° C.

21. The adhered article of claim 4 wherein the adhesive has a 180° adhesion to stainless steel of less than about 1.5 pounds per linear inch (about 270 g/cm).

22. The adhered article of claim 4 wherein the adhesive exhibits no staining to paper.

23. The adhered article of claim 4 wherein block copolymer component b) is a 100% linear styrene-ethylene/butylene-styrene block copolymer.

24. The adhered article of claim 4 wherein block copolymer a) has a diblock content of about 70% and a styrene content of about 30% by weight of the block copolymer.

25. The adhered article of claim 4 wherein the tackifying resin has a softening point of less than 100° C.

26. The adhesive of claim 1 wherein said adhesive has a viscosity of less than 3500 cPs at 175° C.

27. The adhesive of claim 1 wherein said at least one block copolymer of b) has a melt index greater than 5 grams per 10 minutes, and a styrene content of 10–25 wt-%.

* * * * *

UNITED STATES PATENT AND TRADEMARK OFFICE
CERTIFICATE OF CORRECTION

PATENT NO.    : 6,433,069 B1                                               Page 1 of 1
DATED         : August 13, 2002
INVENTOR(S)   : Susan T. Oeltjen et al.

It is certified that error appears in the above-identified patent and that said Letters Patent is hereby corrected as shown below:

Column 11,
Table I, continued "1800 Peel lb/in" should be -- 180° Peel lb/in --

Column 13,
Table III "Example 9  10  12  12" should be -- Example 9  10  11  12 --

Column 14,
Line 67, "abut" should be -- about --

Signed and Sealed this

Fourth Day of March, 2003

JAMES E. ROGAN
*Director of the United States Patent and Trademark Office*